March 11, 1969 R. G. RINALDI ET AL 3,432,811

DATA COMPRESSION/EXPANSION AND COMPRESSED DATA PROCESSING

Original Filed June 30, 1964 Sheet 1 of 7

INVENTORS
RUSSEL G. RINALDI
BRIAN B. MOORE

BY Melvin P. Williams

ATTORNEY

FIG. 6

COMPRESS MODE ADDRESS

| A | B | INDEX REG ADDRESS |
|---|---|---|
| | | NONE |
| X | | 85 – 89 |
| | X | 90 – 94 |
| X | X | 95 – 99 |

| ZONES | B = 2<br>A = 1 | B<br>A | B = 8<br>A = 4 |
|---|---|---|---|
| NUMERALS | 8 | 8 | 8 |
| | 4 | 4 | 4 |
| | 2 | 2 | 2 |
| | 1 | 1 | 1 |
| | HUNDS | TENS | UNITS |

FIG. 7

CONVERT 2/5 TO BINARY: TRUTH TABLE

| 2/5 | | | | | | | | | | DEC | BINARY | | | |
|---|---|---|---|---|---|---|---|---|---|---|---|---|---|---|
| TT | | | | | TH | | | | | | | | | |
| 0 | 1 | 2 | 4 | 8 | 0 | 1 | 2 | 4 | 8 | | 1 | 2 | 4 (A) | 8 (B) |
| | | X | | X | | | X | | X | 0 | | | | |
| | | X | | X | X | X | | | | 1 | X | | | |
| | | X | | X | X | | X | | | 2 | | X | | |
| | | X | | X | | X | X | | | 3 | X | X | | |
| | | X | | X | X | | | X | | 4 | | | X | |
| | | X | | X | | X | | X | | 5 | X | | X | |
| | | X | | X | | | X | X | | 6 | | X | X | |
| | | X | | X | | | | X | X | 7 | X | X | X | |
| | | X | | X | X | | | | X | 8 | | | | X |
| | | X | | X | | X | | | X | 9 | X | | | X |
| X | X | | | | | | X | | X | 10 | | X | | X |
| X | X | | | | X | X | | | | 11 | X | X | | X |
| X | X | | | | X | | X | | | 12 | | | X | X |
| X | X | | | | | X | X | | | 13 | X | | X | X |
| X | X | | | | X | | | X | | 14 | | X | X | X |
| X | X | | | | | X | | X | | 15 | X | X | X | X |

United States Patent Office 3,432,811
Patented Mar. 11, 1969

3,432,811

DATA COMPRESSION/EXPANSION AND COMPRESSED DATA PROCESSING

Russell G. Rinaldi, Poughkeepsie, and Brian B. Moore, New Paltz, N.Y., assignors to International Business Machines Corporation, New York, N.Y., a corporation of New York Original application June 30, 1964, Ser. No. 379,332, now Patent No. 3,310,786, dated Mar. 21, 1967. Divided and this application Jan. 19, 1967, Ser. No. 641,067

U.S. Cl. 340—172.5 1 Claim

Int. Cl. G11b *13/00*

ABSTRACT OF THE DISCLOSURE

This invention relates to data processing, and more particularly to a data processing code converter for converting data from binary form to binary coded decimal form.

This case is a division of application Ser. No. 379,332 filed June 30, 1964, and now U.S. Patent 3,310,786.

(1) INTRODUCTION

(a) *Prior art*

In the data processing art, numeric values and alphabetic or special characters are represented in many instances by coded configurations of bit and no bit manifestations. For instance, pure binary numbers are easily represented by a sequence of bit and no bit maifestations, the lowest ordered bit having a value of 1, the next having a value of 2, the next having a value of 4, the highest ordered bit having a value of 2 to the *n*, where *n* equals one less than the position of said bit in said sequence. In binary coded decimal (BCD) representations, the numbers are generally represented in decimal orders or digits, each digit being represented in pure binary form by four bit manifestations which are limited to values between 0 and 9; in the BCD code, a 0 is represented sometimes (as in the embodiment to be described herein) by a combination of the binary 2 bit and the binary 8 bit. The BCD code is used largely in commercial applications which include a necessity for alphameric representation. Such a code generally includes in each character (in addition to the four bit representation of a decimal digit) zone bits (designated herein as the A bit and the B bit) which are used in combination with the BCD digit values to characterize alphabetic and special characters; the code also may include a check or parity bit (herein called a C bit), and, if the system involved utilizes variable length words or fields, the character may include a field delineation marking bit (herein referred to as a word mark bit or WM bit). Thus, in many embodiments, a character representation may include any combination of WM, C, B, A, 8, 4, 2, and 1 bits. This character format is very useful in commercial applications, yet may prove to be wasteful of storage space in situations where a large number of numeric values (digits only) are being stored and handled.

Data packing has been developed in the art as a means of "compressing" numerical information, by utilizing zone bits (such as the A and B bits herein) to assist in representing numerical values. In one form of data compressing device, an entire field of memory is considered to have one numeric value (a group of related digits) represented by the numeric portion (8, 4, 2, and 1 bits) of the characters in that field, and having a different numerical value (or group of related digits) represented by the A and B zone bits of two adjacent characters. In this embodiment, addition of the numeric portions with other related numeric portions, and addition of the numeric value represented by the zone portions with a further numerical value may take place in a combined operation by means of a numeric adder and a zone adder. However, data values added in the numeric adder bear no relationship to the data values added in the zone adder. Additionally, the conversion of data from a packed format (where it is represented by zone bits) to an unpacked, or expanded format (where it is represented by the numeric bits 8, 4, 2, 1) requires additional special cycles so that the compressed character format is achieved at the expense of processing time.

Another form of data packing is utilized where pure binary value representation is involved. A group of eight binary bits, sometimes called a "byte," may represent any numeric, alphabetic or special character by utilizing all eight bits for a single character, or may represent two hexadecimal values, each comprising four bits of pure binary so as to represent values between 0 and 15. In such a situation, the byte significance of the eight bits becomes minimal, the four bit hexadecimal representations indicating merely a sequence of values. For instance, if a "word" contains four bytes (32 bits) and each byte contains two binary numbers, the word actually contains a sequence of eight binary numbers. Thus, packing has no real numeric significance in such a case; a carry out of one of the four bit hexadecimal values into the next higher one is identical to a carry, at the same position, which results from a solid 32-bit binary representation. In another example, the situation is identical to the last one above except for the fact that the numeric values are limited to representing one decimal digit in each of the four binary bits; this becomes (in the 32 bit example) a case where eight decimal orders are represented in BCD notation, carrying out of each order into the next being a normal function. The significant aspect of each of these examples of this type of data packing is that a large word or field of so-called packed information actually represents no more than an ordered sequence of values which are capable of representing values between 0 and 9 or values between 0 and 15 in dependence upon the inclusion of BCD control, or not, respectively.

A further type of data packing comprises a modification of the BCD data packing described in the preceding paragraph. In this type, the four bit representations are limited to decimal values (as in BCD notation), and the low order six bits may be utilized in the unpacked format to represent any desired character. The two high order bits are made 1's (the format being XXXXXXII) to indicate that the unpacked (or expanded) six character format is being utilized. Whenever a packed (or compressed) format is utilized, either one of the two high order bits may be 1 or 0, but not both may be 1's. This is possible because in a BCD format, the two high order bits of a four bit character are never both 1's at the same time. Thus, two decimal values may be represented by the eight bits, or six of the bits may be used for alphabetic and special characters, the other two bits indicating that the unpacked or expanded format is being used.

Each of the foregoing types of data packing or compressing devices is somewhat specialized in one or more respects. The first example does not provide for related character packing, wherein data represented by numeric portions bears an immediate relationship to the data which is represented at least in part by the zone portions, and said first type also has not developed a handy method of converting from one type to another as is required in devices of that type. The second type above is actually a case of a pure sequence of values in binary or BCD notation, when in the seemingly packed or compressed format representing numeric values. Said second type is also limited in not providing, when in the packed format, any bits which may be utilized as word mark or parity bits. This limitation applies also to the third type of data packing device described above due to the fact that said third type utilizes the two high order bits to indicate an unpacked or expanded condition.

(b) *Objects*

It is, therefore, a primary object of the present invention to provide for data packing and unpacking, and the handling of data in a packed format wherein characters represented by numeric portions are related to the characters which are at least in part represented by adjacent zone bits.

Other objects of the invention include the provision of:

A data packing device suitable for use in a variable word length system wherein decimal values are represented in BCD notation;

An improved binary to decimal conversion circuit;

Improved circuitry for handling, converting, and controlling operations upon data.

In accordance with the environment of the present invention, a plurality of related eight bit characters, including a number of data designating bits in each character, may represent one value each, and may together represent an additional value by means of assigning at least one bit manifestation of each of said characters a value counting toward a total value of an additional character. For example, in the exemplary embodiment described hereinafter, two related characters, each including (inter alia) A and B zone bits as well as four BCD value-representing bits, will represent, in a packed format, a third value which is equal to a combined binary value representation of the A and B bits therein. In this embodiment, the value represented by the two sets of A and B zone bits is considered to be higher-ordered than the values represented by the numeric portions of the two related characters; further the values of the A and B zone bits in the higher-ordered character are given weights of 1 and 2 respectively, whereas the values of the A and B bits in the lower ordered character are given weights of 4 and 8, respectively. This permits carries emanating from adding the numeric portions of two such packed characters to immediately propagate into the addition of their zones, a carry resulting from the addition of said zones being compensated for in one or more ways as described in detail in Sections 3*d* and 3*h*, in the aforementioned parent application now U.S. Patent 3,310,786.

In accordance with further aspects of the environment of the present invention, addresses may be expressed in terms of packed values, so as to achieve storage of said addresses in fewer locations than would be required if unpacked addresses were utilized, and also so as to permit compatability of a larger data processing system (requiring, for instance, five character addresses to reach a greater number of storage locations), with a smaller data processing system (which may utilize, for instance, three character addresses to reach only a thousand locations of storage). In accordance with the embodiment of this invention described hereinafter, a three-character address is expanded to a five-character address by utilizing the zone bits in the units order character and hundreds order character of each address, in combination, so as to achieve two additional characters, thereby realizing a five-character address. After a five-character address is achieved, it may be incremented with a three character indexing factor by utilizing zones in the units and hundreds order characters of the increment to achieve an additional two characters of increment for adding with the highest-ordered two characters of the expanded, five-character address. A five-character address stored in a five-position storage register may be compressed into a three character address and stored in the main storage means or memory of the system.

In further accord with the environment of this invention referenced hereinafter, two values, each expressed in a three-character packed format, may be added together, without first unpacking them, and a three-character result not packed format stored in memory; this may be achieved without utilizing any more time than would be required to handle a five-character value expressed in an unpacked, five-character format.

The examples chosen for purposes of illustration in the embodiment described herein are not exclusive, but exemplary only. Other formats and arrangements may be utilized in accordance with the principles of this invention to achieve packed data wherein there is a direct relationship between the data value of zone bits and numeric bits of each character. Similarly the total, related value comprising several characters, including pure numeric portions and numeric-zone combination portions, may have a variety of overall formats, even though the format chosen for purposes of illustration herein includes units and hundreds orders with zone bits which form additional values, and a tens order wherein only the numeric portion has value-representing significance in the overall three-character format utilized herein.

(c) *Brief statement of invention*

In accordance with the above-mentioned environment, the present invention is a code converter which accepts, as an input, a single-ordered value, represented in pure binary form, and converts that first value into a dual-ordered second value, represented in binary coded decimal form.

The two orders of the second value, by way of example, represent the thousands (TH) and ten thousands (TT) address portions of a five character address. As discussed above, the single-ordered first value is formed from the A and B zone bits derived from a three character address and that single-ordered first value is in binary form consisting of any combination of 1, 2, 4, and 8 bits representing decimal values from 0 to 15. Since the purpose of the zone bits is to expand a three-character address into a five-character address, two new addresses (TH and TT) in binary coded decimal form must be derived from that single-ordered first value, that is, from the 1, 2, 4, and 8 binary bits.

The code converter of the present invention achieves the desired conversion by employing means which convert the binary input (the first value) to a *first* binary coded decimal output (the first order of the second value) and that output represents the TH address level. Since the binary input may range from decimal 0 to 15 the TH level will correspond either to the decimal 0 to 9 input or to the first digits, decimal 0 to 5, of binary inputs from decimal 10 to 15.

Additionally, the code converter of the present invention employs means for generating a *second* binary coded decimal output consisting of a decimal 0 (second order of the second value) for the TT address level when the binary input (first value) is between decimal 0 and decimal 9.

And still additionally, the code converter of the present invention provides means for generating a *second* binary coded decimal output consisting of a decimal 1 (second order of second value) representative of the TT level when the first value is between decimal 10 and decimal 15.

Other objects, features, and advantages of the present invention will become apparent with respect to the following detailed description of a particular embodiment thereof, as shown in the accompanying drawings.

(d) *Description of the drawings*

In the drawings, FIG. 1 is a schematic block diagram of an apparatus for expanding and compressing data and for adding items of data in compressed form, in accordance with the present invention.

FIGS. 4–7 are charts illustrating I, A and B CYCLES; X CYCLES; COMPRESS MODE ADDRESS format; and a CONVERT 2/5 TO BINARY TRUTH TABLE; respectively.

Figure 8:
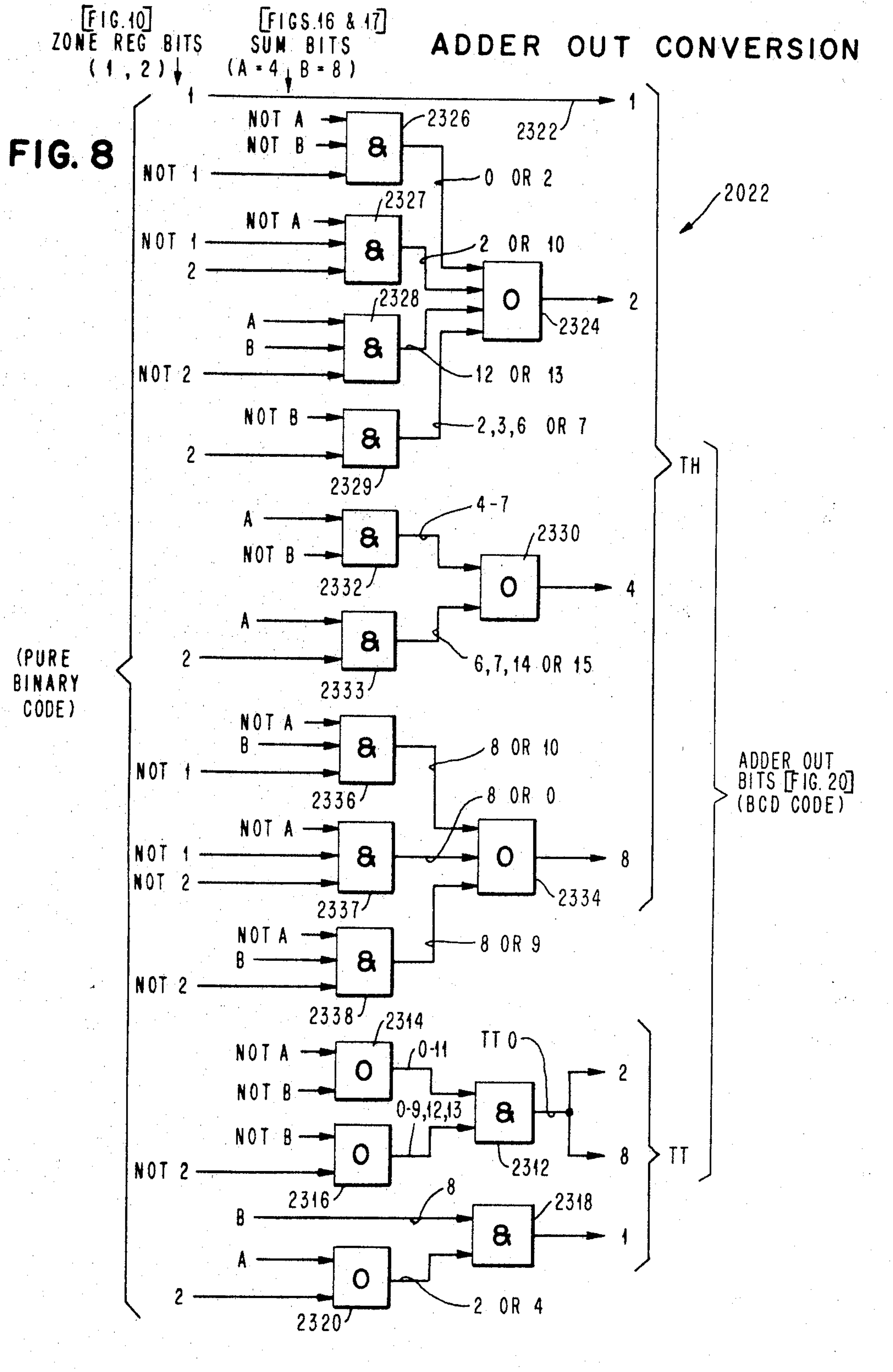

FIGURE 8 depicts the code converter of the present invention and is labelled an ADDER OUT CONVERSION circuit in conformance with its particular use in the above mentioned Rinaldi et al. patent.

References in the drawings of this invention to related figures in the copending patent application of Richard S. Carter and Walter W. Welz entitled "Parallel Memory, Multiple Processing, Variable Word Length Computer," Ser. No. 332,648, filed Dec. 23, 1963, and now U.S. Patent 3,270,235 are designated as such in this case by parentheses ( ). Similarly, references to drawings in the parent application, Ser. No. 379,332 (now U.S. Patent 3,310,786) are designated as such in this case by brackets [ ].

(2) BRIEF DESCRIPTION OF AN ENVIRONMENTAL SYSTEM

Figure 1:
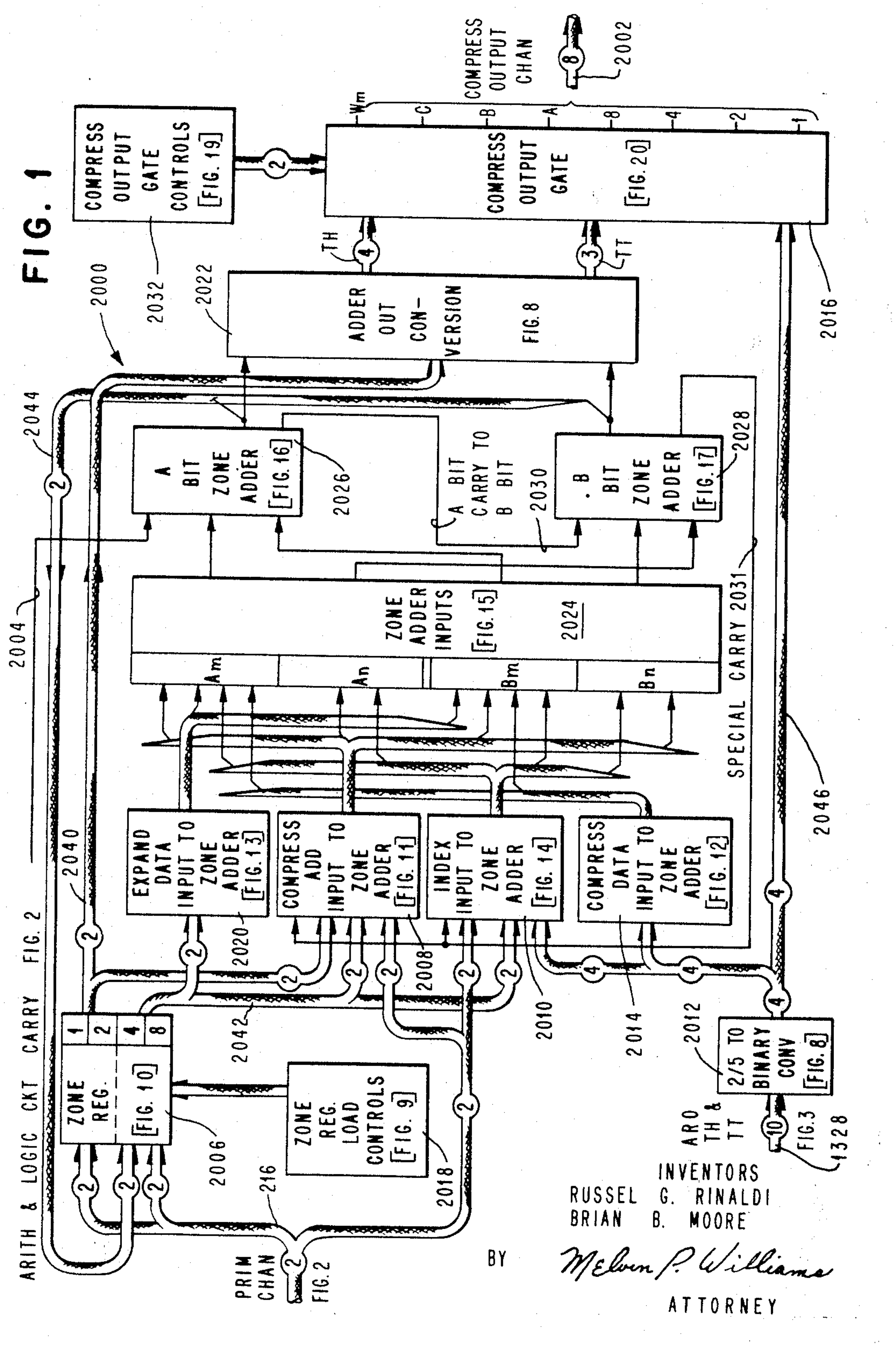

Referring to FIG. 1, an exemplary embodiment of apparatus to expand data, compress data, to add data in compressed format, and to index compressed addresses is illustrated schematically. FIG. 1 represents only the data flow of the apparatus, the control circuits being shown in the aforesaid parent application of Rinaldi and Moore.

Figure 2:
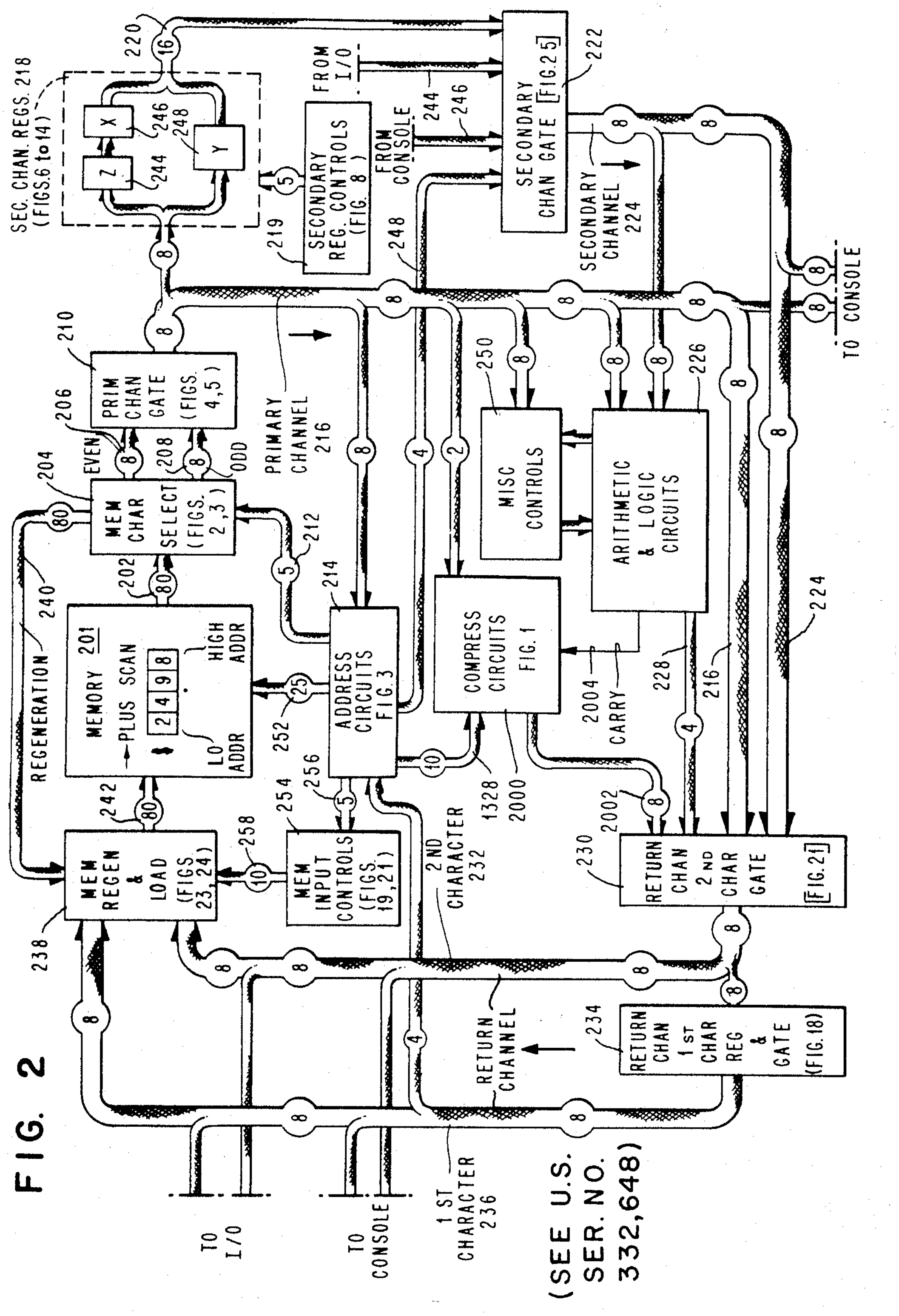
FIG. 2 is a simplified schematic block diagram of a data processing system which may form the environment for the apparatus of FIG. 1.
Figure 3:
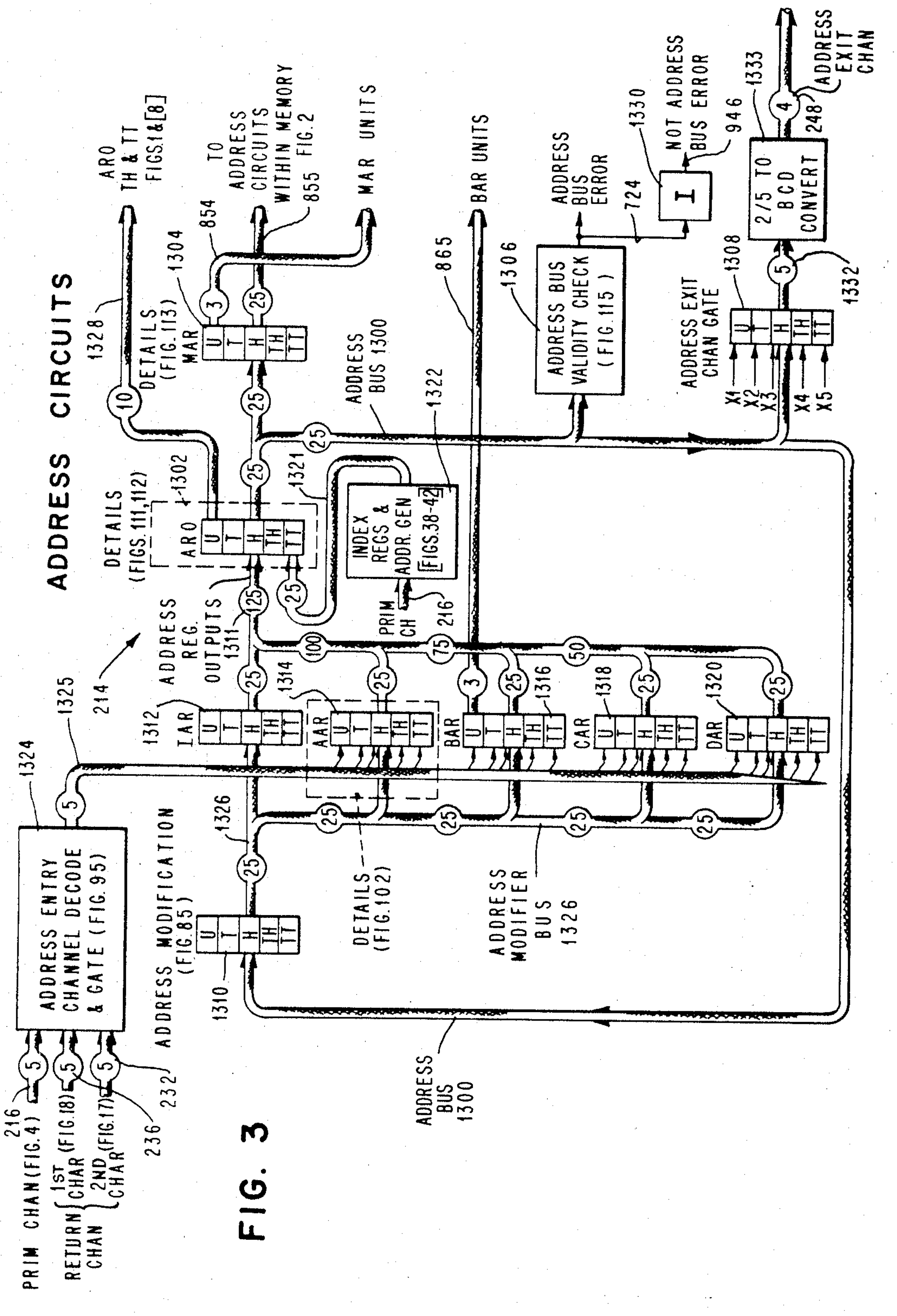
FIG. 3 is a simplified schematic block diagram of ADDRESS CIRCUITS suitable for inclusion in the system shown in FIG. 2.
Figure 4:
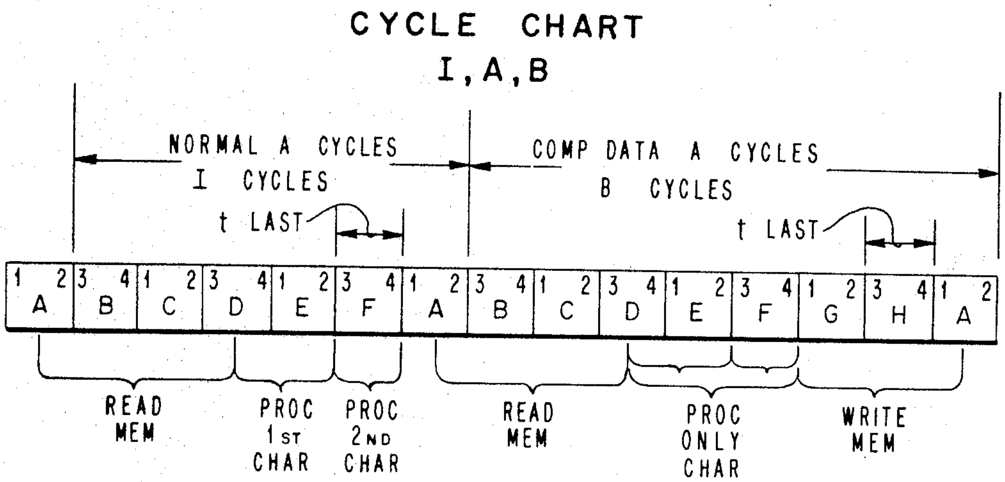
Figure 5:
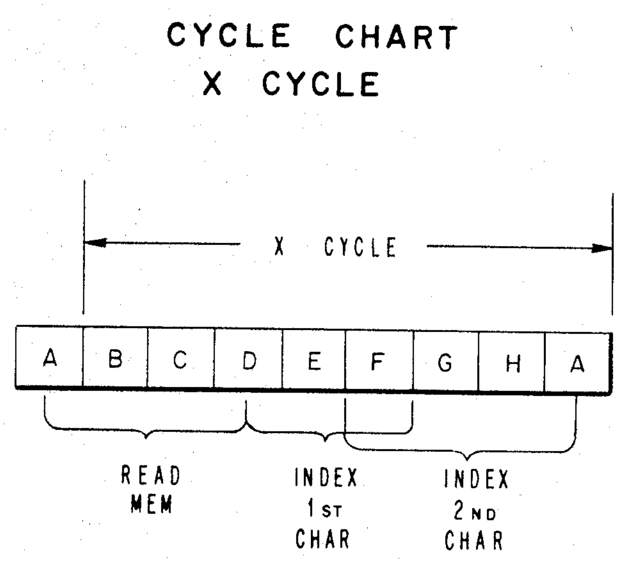

The apparatus of FIG. 1, which comprises the COMPRESS CIRCUITS 2000 (center of FIG. 2), is shown in its relationship to the overall data flow of a system which may form the environment for said apparatus, as shown in FIG. 2. In the drawings, any figure numbers in parentheses refer to figures of said copending application. Non-parentheticated figures refer to this application.

The circuit of FIG. 2 represents a block diagram of a system data flow which will handle a fully flexibly-addressed, variable-word-length, multiple-processing computer which is serviced by a parallel-readout, bounded memory. This system is fully disclosed and claimed in a copending patent application of Richard S. Carter and Walter W. Welz entitled "Parallel Memory, Multiple Processing, Variable Word Length Computer," Ser. No. 332,648, filed Dec. 23, 1963, now U.S. Patent 3,270,235 and assigned to the same assignee as this application.

Referring again to FIG. 1, the COMPRESS CIRCUITS 2000 comprise a variety of INPUT circuits, a REGISTER with its controls, an ADDER, CONVERSION circuits and OUTPUTS circuits.

Specifically, data inputs to the COMPRESS CIRCUITS include a CARRY input from the ARITHMETIC and LOGIC CIRCUITS 226 via a line 2004; inputs from the PRIMARY CHANNEL 216; and inputs from the ADDRESS CIRCUITS 214 over a ten bit bus 1328. The PRIMARY CHANNEL 216 may feed either a low or high half of a ZONE REGISTER 2006, so as to cause A and B zone bits to be lodged in 1 and 2 bit positions, alternatively. The PRIMARY CHANNEL 216 also feeds a COMPRESS ADD INPUT TO ZONE ADDER circuit 2008 and an INDEX INPUT TO ZONE ADDER circuit 2010.

The ten bit bus 1328 from the ADDRESS CIRCUITS actually comprises the thousands (TH) and ten thousands (TT) positions of the address read out (ARO), hereinafter referred to as ARO, TH and TT. This is applied to a 2/5 TO BINARY CONVERT circuit 2012 which in turn feeds the INDEX INPUT TO ZONE ADDER circuit 2010, a COMPRESS DATA INPUT TO ZONE ADDER circuit 2014, and a COMPRESS OUTPUT GATE 2016, via a four bit bus 2046.

The ZONE REGISTER 2006 is controlled by ZONE REGISTER LOAD CONTROLS 2018, and supplies data to the COMPRESS ADD INPUT TO ZONE ADDER circuit 2010, as well as to an EXPAND DATA INPUT TO ZONE ADDER circuit 2020 and an ADDER OUT CONVERSION circuit 2022. The various INPUT TO ZONE ADDER circuits 2008, 2010, 2014, 2020 all feed the ZONE ADDER INPUTS 2024. This, in turn, feeds an A BIT ZONE ADDER 2026 (which receive the CARRY, on line 2004), and a B BIT ZONE ADDER 2028 which also receives an A BIT CARRY TO B BIT on a line 2030. The ZONE ADDER circuits 2026, 2028 supply results to the ZONE REGISTER 2006 as well as to the ADDER OUT CONVERSION circuit 2022, which in turn feeds the COMPRESS OUTPUT GATE 2016, which is controlled by the COMPRESS OUTPUT GATE CONTROLS circuit 2032. The COMPRESS OUTPUT GATE 2016 supplies information to the eight bit bus 2002, which comprises the COMPRESS OUTPUT CHANNEL.

The subject code converter is capable of operating with each of the related operations described in the aforementioned Rinaldi et al., U.S. Patent 3,310,786 (e.g., see therein Cols. 11 and 12. *Expand data* for one such operation). The details relating to the operation of the code converter of the present invention and disclosed therein are incorporated by references herein.

SUMMARY CHART OF COMPRESS MODE INDEXING

X1—Read CAR TT and TH through ARO to the 2/5 TO BINARY CONV.; read first character increment out of MEMORY, and UNITS position out of CAR; add zones to CONV. 4 and 8 bits, put result in ZN. REG. 4 and 8; carry is ignored; add UNITS numerics, put numeric result in units position of AAR.

X2—Same as X1 but no zones are used, and TENS position of CAR is added to second char. of increment; result stored in T position of AAR.

X3—Read out third character of increment and add numerics to HUNDS. position of CAR; add zones and numeric carry, if any, to CONV. 1 and 2 bits; put result in ZN. REG. 1 and 2; may set SPECIAL CARRY. Put numeric result in HUND. pos. of AAR.

X4—Read ZN. REG. 1 and 2 to ADDER OUT CONV.; read ZN. REG. 4 and 8 to ADDER, along with SPEC. CARRY, to get a final sum of 4 and 8 bits to ADDER OUT CONV.; decode TH and TT orders and store TH in TH of AAR.

X5—Same as X4 but store TT in TT of AAR.

(3) DETAILED DESCRIPTION OF CODE CONVERTER

The ADDER OUT CONVERSION circuit 2022, shown in FIG. 8, is best understood with reference to the binary code shown in FIG. 7 (sheet 6); the BCD code is the same as the binary code except that the BCD value of zero is an 8 and 2 bit combination, and there are no values greater than nine; values of ten through fifteen are represented by TH values of zero through five together with a TT value of one. Referring first to the top of FIG. 8, and to FIG. 1, notice that the inputs to the ADDER OUT CONVERSION circuit comprises an A BIT SUM from the A BIT ZONE ADDER 2026, a B BIT SUM from the B BIT ZONE ADDER 2028, and the 1 and 2 bits from the ZONE REGISTER 2006. In determining what the output from the ADDER OUT CONVERSION should be, the ZONE REGISTER 1 and 2 bits have a binary value of ONE and TWO respectively; the sum bits have values such that the A bit equals FOUR and the B bit equals EIGHT. Thus, any combinations of 1, 2, 4, and 8 can be derived as a result of the A SUM and B SUM (ZONE ADDER outputs) and the 1 and 2 bits (from the ZONE REGISTER).

Referring to the bottom of FIG. 8, the ten thousands order is represented by the ADDER OUT TT BITS which may comprise (in the BCD code) a 2 bit and an 8 bit to represent that the ten thousands order is a zero, or a 1 bit, to represent that the ten thousands order is a one.

It should be recalled that the ten thousands and thousands together may represent values of from zero to fifteen only; therefore the ten thousands order can never be other than a one or a zero (zero being represented by the combination of a 2 bit and an 8 bit in the BCD code).

A ten thousands value of zero (2 and 8) is generated by an AND circuit 2312 if there is either a NOT A (not 4) or a NOT B (not 8) as determined by an OR circuit 2314 concurrently (AND circuit 2312) with a NOT B (not 8) or a NOT 2 as determined by an OR circuit 2316. The NOT A (not 4) and NOT B (not 8) applied to OR circuit 2314 recognize all the decimal values between zero and eleven; the NOT B (not 8) and NOT 2 applied to the OR circuit 2316 will recognize the decimal values zero through nine, twelve and thirteen. Therefore the AND circuit 2312 recognizes *only* values of zero through nine, which will thereby generate a TT zero combination (8 and 2 in BCD).

The OR circuit 2320 responds to the A bit (a 4) or the 2 bit to recognize values of two through seven and ten through fifteen; with the 8 bit applied, the AND circuit 2318 recognizes only ten through 15, whereby the TT order is a one (a 1 bit in BCD).

At the top of FIG. 8, a line 2322 illustrates that a binary input of 1 causes a BCD output of 1, any odd number remains an odd number.

An OR circuit 2324 responds to any one of four AND circuits 2326–2329 to generate a BCD 2 bit. The AND circuit 2326 recognizes the condition when there is no 4 or 8 (represented by A and B) and no 1 bit in the binary code; referring to the binary portion of the chart of FIG. 7 it will be seen that the only values which have no 1, 4, or 8 are decimal zero and decimal two. The AND circuit 2327 recognizes the case where there is no 4 bit (represented by A) and no 1 bit, but there is a 2 bit; this AND circuit therefore recognizes binary inputs having a decimal value of two or ten. The AND circuit 2328 responds to a 4 and an 8 (represented by A and B) and the absence of a 2 bit; this occurs only for decimal values twelve or thirteen. The AND circuit 2329 recognizes a case where there is no 8 bit (represented by B) but there is a 2 bit; this occurs for binary inputs having a decimal equivalent of two, three, six or seven. Thus, the OR circuit 2324 recognizes decimal zero, two, three, six, seven, ten, twelve and thirteen, where ten, twelve and thirteen require TH values of zero, two and three, respectively, together with a TT value of one.

An OR circuit 2330 generates a BCD 4 bit in response to either of two AND circuits 2332, 2333. The AND circuit 2332 recognizes the case where there is a 4 (represented by A) but no 8 (represented by B); this occurs whenever binary inputs have a decimal equivalent of four through seven. The AND circuit 2333 recognizes the case where there is a 4 (represented by A) and a 2; this occurs whenever the inputs equal decimal six, seven, fourteen or fifteen. Thus, OR circuit 2330 generates a binary 4 bit for four through seven, fourteen and fifteen, where fourteen and fifteen require a TH value of four and five, respectively, together with a TT value of one.

An OR circuit 2334 responds to any one of three AND circuits 2336–2338 to generate a BCD 8 bit. The AND circuit 2336 responds to not 4 (NOT A) with an 8 (B) and not 1; this corresponds to decimal eight or ten. The AND circuit 2337 responds to not 4 (NOT A), not 1 and not 2 which represent decimal values of eight or zero. The AND circuit 2338 responds to not 4 (NOT A) and 8 (B) with not 2; this is equal to a decimal value of eight or nine. Thus, OR circuit 2334 recognizes zero, or eight through ten, to generate an 8 bit; higher values use a TH of zero–five with a TT value of one.

Thus each of the circuits shown in FIG. 8 recognizes certain conditions in a truth table (the binary code shown in FIG. 7) to generate an equivalent BCD code. The BCD code is equal to the 2/5 code with exception of the fact that use of a 0 bit is eliminated, and a seven is represented by 1, 2 and 4, rather than the 4 and 8 bits as shown for the 2/5 code.

While the invention has been particularly shown and described with reference to a preferred embodiment thereof, it will be understood by those skilled in the art that various changes in form and details may be made therein without departing from the spirit and the scope of the invention.

What is claimed is:

1. A code converter, for converting from a single-ordered first value represented in pure binary form by first value 1, 2, 4 and 8 bit signals to a dual-ordered second value represented in binary coded decimal form, comprising:
   - first means responsive to the first value signals to generate first order 1, 2, 4, and 8 bit signals representing decimal values between zero and nine in the binary coded decimal form, said first means thereby forming a first order of said second value;
   - second means including a first OR circuit responsive to the absence of first value 4 bit or 8 bit signals, alternatively, including a second OR circuit responsive to the absence of first value 8 bit or 2 bit signals, alternatively, and including an AND circuit connected to receive outputs from said first and second OR circuits and operative upon the concurrent response of said OR circuits to generate second order 8 bit and 2 bit signals thereby forming a second order of said second value;
   - and third means including a third OR circuit responsive to the presence of first value 2 bit or 4 bit signals, alternatively, and including a second AND circuit detecting the concurrence of a third OR circuit response and the presence of a first value 8 bit signal to generate a scond order 1 bit signal for said second order of said second value.

References Cited

UNITED STATES PATENTS

| | | | |
|---|---|---|---|
| 2,860,327 | 11/1958 | Campbell | 340—347 |
| 3,026,034 | 3/1962 | Couleur | 235—155 |

OTHER REFERENCES

A Simplified Method for the Design of Logical Conversion Matrices, M. L. Klein, Electronic Engineering, June 1955, p. 270.

PAUL J. HENON, *Primary Examiner.*

ROGER M. RICKERT, *Assistant Examiner.*

U.S. Cl. X.R.

340—347; 235—155